United States Patent
Van Tuyl

(10) Patent No.: US 6,920,262 B2
(45) Date of Patent: *Jul. 19, 2005

(54) OPTICAL PULSE STRETCHER FOR CONVERTING RZ OPTICAL DATA TO NRZ OPTICAL DATA FOR A LOW JITTER NRZ TRANSMITTER

(75) Inventor: Rory Lynn Van Tuyl, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/325,198

(22) Filed: Dec. 18, 2002

(65) Prior Publication Data

US 2004/0120627 A1 Jun. 24, 2004

(51) Int. Cl.[7] ............ G02B 6/28; H04B 10/12; G02F 1/01

(52) U.S. Cl. .............. 385/24; 385/11; 385/15; 398/189; 359/237; 359/238

(58) Field of Search ............... 385/11, 15, 24; 398/140, 141, 146, 152, 173–175, 182, 189; 359/237–244

(56) References Cited

U.S. PATENT DOCUMENTS 6,532,091 B1 * 3/2003 Miyazaki et al. .......... 398/175

* cited by examiner

Primary Examiner—Michelle R. Connelly-Cushwa

(57) ABSTRACT

The present invention pertains to method and apparatus for optically stretching an optical pulse to convert associated optical data from a first format to a second format. Moreover, the present invention pertains to method and apparatus for optically reducing the jitter of an optical data stream having optical pulses, enabling the transmission of low jitter optical data.

30 Claims, 8 Drawing Sheets

OPTICAL PULSE STRETCHER FOR CONVERTING RZ OPTICAL DATA TO NRZ OPTICAL DATA FOR A LOW JITTER NRZ TRANSMITTER

BACKGROUND OF THE INVENTION

1. Field of the Invention

The present invention generally relates to optical systems. More particularly, the present invention relates to optically converting RZ (return-to-zero) optical data to NRZ (non-return-to-zero) optical data in an optical system.

2. Related Art

In various practical applications, it is desirable to change the shape of an optical pulse by "stretching" it to distribute its energy over a longer time interval than that of the original optical pulse. A conventional system for stretching a pulse is depicted in prior art FIG. 1. This conventional system is also known as a split-delay-sum pulse stretcher 100.

As shown in prior art FIG. 1, the split-delay-sum pulse stretcher 100 receives an input pulse 10. A pulse splitter 20 splits the input pulse 10 into two equal pulse portions 10A and 10B. A delay device 30 delays the pulse portion 10B with respect to the pulse portion 10A. Moreover, a pulse combiner 40 recombines the two equal pulse portions 10A and 10B, forming a stretched pulse 50 whose width (or duration) is greater than the input pulse's 10 width by the amount of the added delay from the delay device 30.

In order for the split-delay-sum pulse stretcher 100 to function properly, the pulse portions 10A and 10B must not add coherently in the pulse combiner 40. If the pulse portions 10A and 10B are baseband voltage pulses rather than optical pulses, there is no problem at the pulse combiner 40. However, if the pulse portions 10A and 10B are optical, there will be interference (destructive or constructive) between the combining pulse portions 10A and 10B if the light of the input optical pulse 10 has a coherence time greater than the delay provided by the delay device 30. This interference can cause significant distortion of the shape of the stretched optical pulse 50. Also, in the case of coherent optical pulses, any temporal variation of the delay provided by the delay device 30 will cause temporal variation of the shape of the stretched optical pulse 50.

Moreover, optical data transmission can be impaired by jitter, which is a random or deterministic variation of the optical data stream's state transitions as compared to a reference clock. Optical data transmitters need to have low jitter, especially when they are used to measure the added jitter of tested devices or transmission systems. Methods exist for reducing transmitted jitter of electronic data streams, and for reducing transmitted jitter of RZ (return-to-zero) encoded optical data streams. In a RZ optical data stream, an optical data bit representing a logic "1" (light on) includes a logic "0" (light off) for a portion (e.g., half) of the unit interval of the bit. However, there exist no practical methods for reducing the jitter in NRZ (non-return-to-zero) encoded optical data streams. In a NRZ optical data stream, an optical data bit representing a logic "1" (light on) remains at the logic "1" state for the entire unit interval of the bit.

SUMMARY OF THE INVENTION

The present invention pertains to method and apparatus for optically stretching an optical pulse to convert associated optical data from a first format to a second format. Moreover, the present invention pertains to method and apparatus for optically reducing the jitter of an optical data stream having optical pulses, enabling the transmission of low jitter optical data.

BRIEF DESCRIPTION OF THE DRAWINGS

The accompanying drawings, which are incorporated in and form a part of this specification, illustrate embodiments of the invention and, together with the description, serve to explain the principles of the present invention.

Prior art

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

In the description of the present invention, it should be understood that "optical" applies to any form of electromagnetic signal (e.g., radio frequency, microwave, millimeter wave, infrared, visible, ultraviolet, x-ray, etc.) irrespective of the medium of propagation (e.g., free space, waveguide, transmission line, etc.). It should be further understood that "optical pulse" refers to any of the above-mentioned cases in which the intensity of the "optical" wave is modulated in such a way as to produce an increase in the intensity of the "optical" wave for the duration of the pulse.

Figure 1:
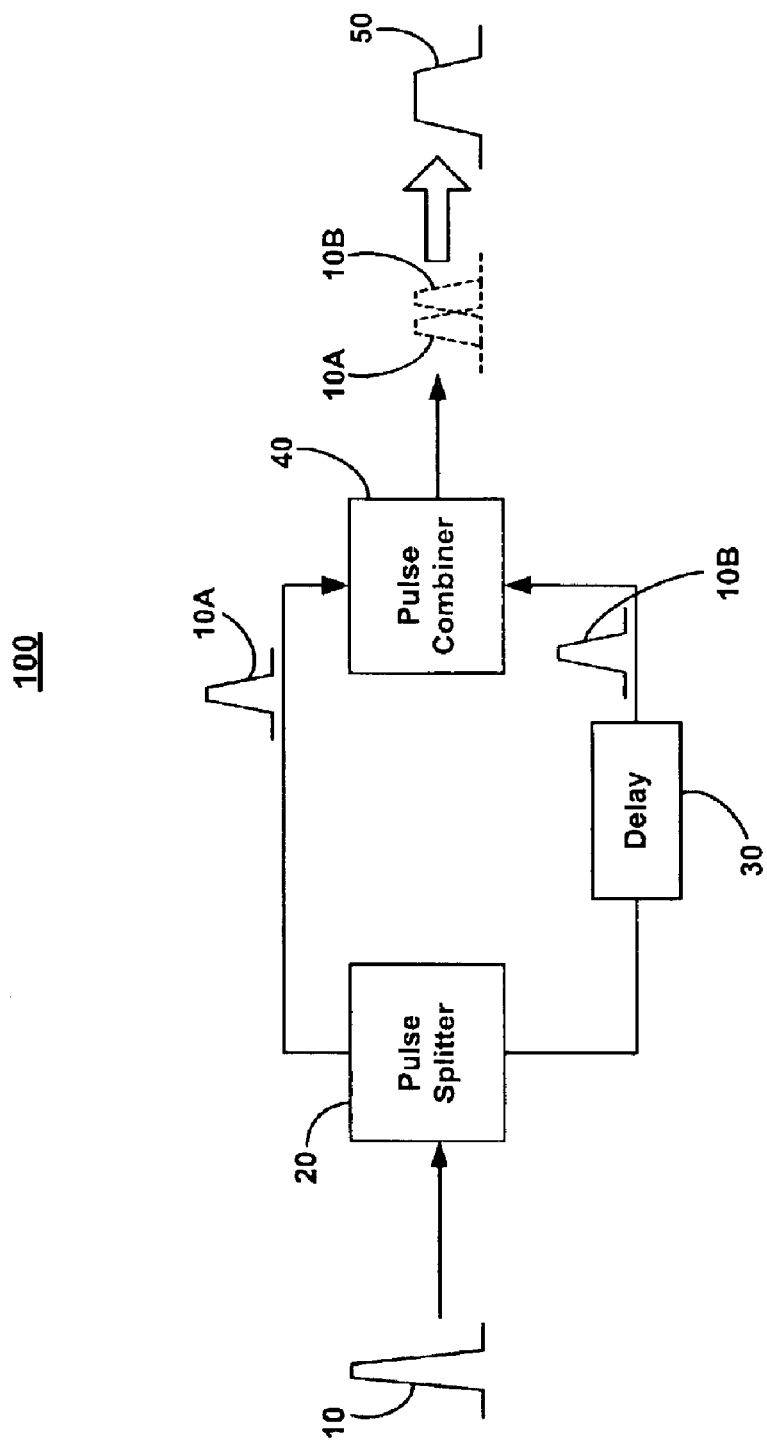
FIG. 1 illustrates a conventional system for stretching a pulse.
Figure 2A:
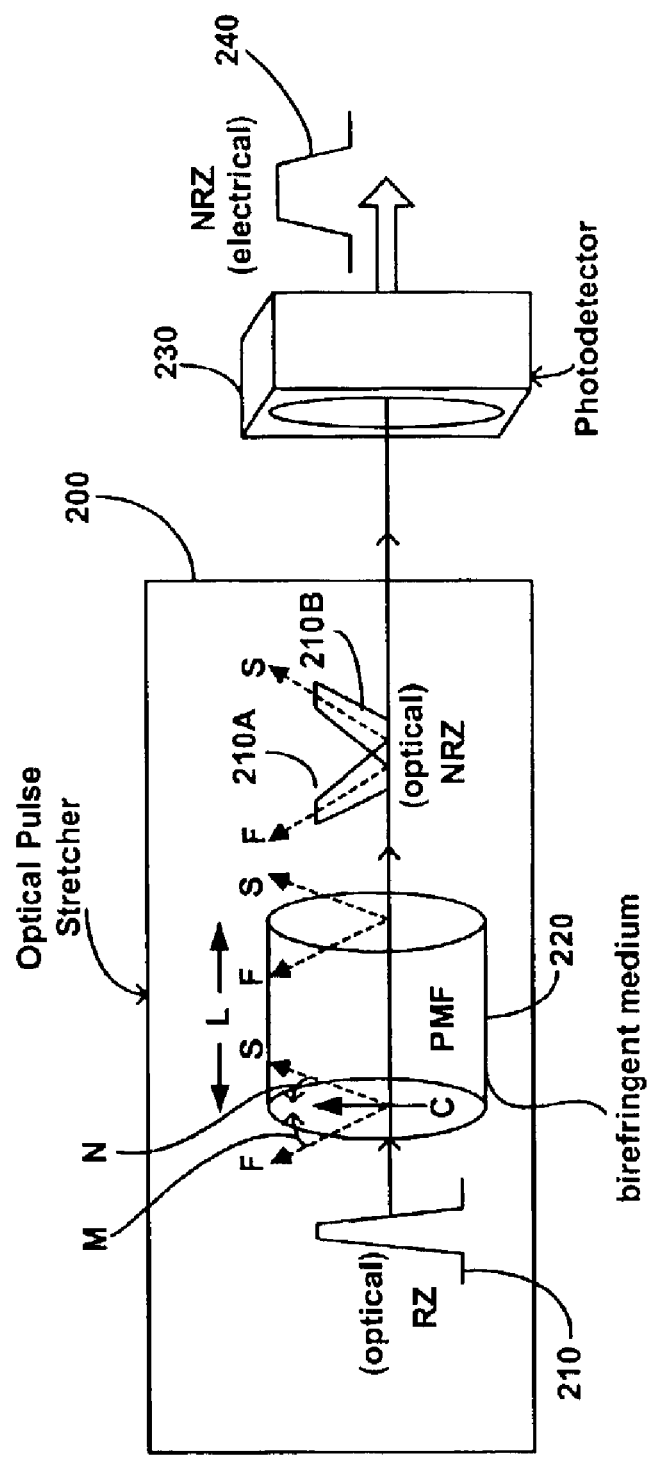
FIG. 2A illustrates an optical pulse stretcher in accordance with an embodiment of the present invention, showing a photodetector coupled to the optical pulse stretcher.

FIG. 2A illustrates an optical pulse stretcher 200 in accordance with an embodiment of the present invention, showing a photodetector 230 coupled to the optical pulse stretcher 200. As described above, the split-delay-sum pulse stretcher 100 of FIG. 1 has many drawbacks and deficiencies. The optical pulse stretcher 200 of the present embodiment overcomes these drawbacks and deficiencies. Moreover, the optical pulse stretcher 200 performs the pulse stretching in a purely optical manner, enabling the stretching of low-jitter RZ optical pulses without having to convert these pulses to electronic form prior to stretching, a process which could introduce unwanted jitter to the stretched pulses.

As depicted in FIG. 2A, optical pulse stretcher 200 of the present embodiment comprises a birefringent medium 220 having a length L. The birefringent medium 220 includes a first principal axis F (also called the fast axis) and a second principal axis S (also called the slow axis) which is orthogonal to the fast axis F. In the present embodiment, an optical pulse 210 propagates along the fast axis F at a greater velocity than the velocity at which it propagates along the slow axis S. The birefringent medium 220 of the present embodiment can be comprised of any of various materials. Optic fiber, birefringent quartz, and birefringent alumina are examples of materials suitable for the birefringent medium 220. In particular, these material compositions provide both a fast axis and a slow axis. In an embodiment, the birefringent medium 220 is a polarization maintaining fiber (PMF).

Figure 3A:
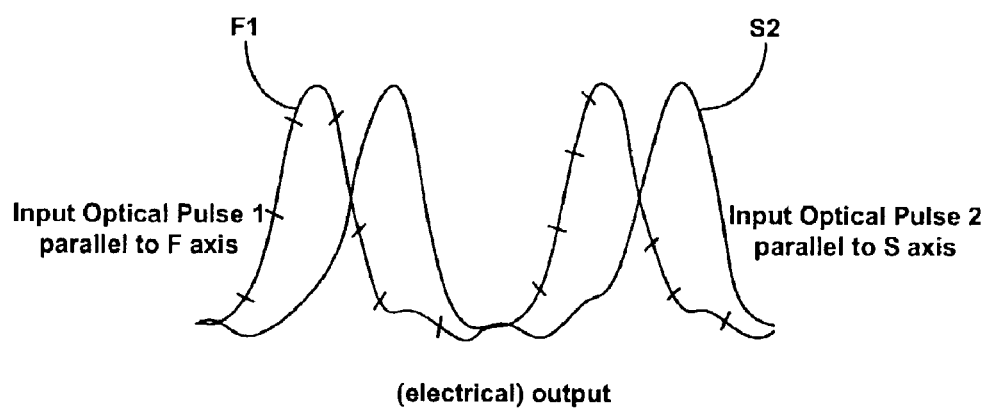
FIG. 3A illustrates a first electrical output of the photodetector of FIG. 2A in accordance with an embodiment of the present invention.

If the optical pulse 210 is sent through the birefringent medium 220 with a polarization aligned with either of the principal axes F or S, the optical pulse 210 propagates through the birefringent medium 220 and emerges in the same state of polarization as it was launched. For example, FIG. 3A illustrates an electrical output F1 of the photodetector 230 when an input optical pulse 1 with a polarization that is parallel to the fast axis F is sent through the birefringent medium 220. Moreover, FIG. 3A illustrates an electrical output S2 of the photodetector 230 when an input optical pulse2 with a polarization that is parallel to the slow axis S is sent through the birefringent medium 220. As expected, the electrical output S2 is delayed with respect to the electrical output F1. However, if the optical pulse 210 is launched with a linear polarization along the axis C that is not aligned with the principal axes F and S, then a portion 210A of the optical pulse 210 propagates along one of the principal axes while another portion 210B of the optical pulse 210 propagates along the other principal axis.

Figure 3B:
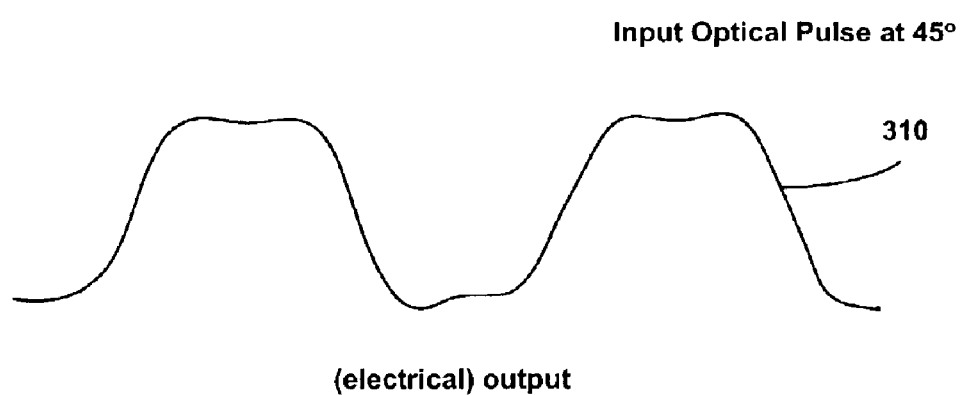
FIG. 3B illustrates a second electrical output of the photodetector of FIG. 2A in accordance with an embodiment of the present invention.

The angle M is the angle between the axis C and the fast axis F. The angle N is the angle between the axis C and the slow axis S. The angles M and N determine the amount of the optical pulse 210 that travels on the fast axis F and slow axis S through the birefringent medium 220. For example, if angles M and N are 45 degrees, then equal portions of the optical pulse 210 travel along the fast axis F and slow axis S. In such instance, a pulse-type shape results when the two portions are detected at the output of the birefringent medium 220. For example, FIG. 3B depicts an electrical output 310 of the photodetector 230 when an input optical pulse with a linear polarization that is at 45 degrees to the fast axis F and the slow axis S is sent through the birefringent medium 220. The electrical output 310 has a pulse-type shape. Additionally, if angle M is greater than angle N, then a greater portion of the optical pulse 210 travels along the slow axis S. However, if angle N is greater than angle M, then a greater portion of the optical pulse 210 travels along the fast axis F.

Because of birefringence, the two portions 210A and 210B of the optical pulse 210 travel at different velocities. This results in two changes. First, the optical pulse becomes broadened or stretched because the two portions 210A and 210B of the optical pulse 210 travel the length L at different velocities, arriving at the output of the birefringent medium 220 at different times. Hence, selection of the length L can be used to produce a predetermined delay between the two portions 210A and 210B of the optical pulse 210. Secondly, the state of polarization of the optical pulse 210 becomes modified. Now, there are two orthogonally polarized optical pulses 210A and 210B at the output of the birefringent medium 220. Since the optical pulses 210A and 210B are orthogonally polarized, these optical pulses 210A and 210B would not interfere with each other in the photodetector 230, unlike the situation in the conventional split-delay-sum pulse stretcher 100 of prior art FIG. 1.

In one embodiment of the present invention, the optical pulse stretcher 200 of the present embodiment is used to stretch an optical pulse to convert the associated optical data from a first format to a second format. For example, a RZ optical data stream can be converted into a NRZ optical data stream using the optical pulse stretcher 200. Typically, the duration of the optical pulse in a NRZ optical data stream is approximately twice the duration of the optical pulse in a RZ optical data stream.

In particular, an optical pulse 210 of the RZ optical data stream enters the input of the birefringent medium 220 (e.g., polarization maintaining fiber (PMF) 220) with linear polarization along the axis C which is 45 degrees to the principal axes F and S of the birefringent medium 220. In an embodiment, the birefringent medium 220 is a polarization maintaining fiber (PMF) 220.

When the optical pulse 210 emerges from the PMF 220, it comprises an early optical pulse 210A, which is the component of the original optical pulse 210 that has traveled along the fast axis F, and a late optical pulse 210B, which is the component of the original optical pulse 210 that has traveled along the slow axis S. For RZ-to-NRZ conversion where the duration of the optical pulse of NRZ optical data is approximately twice the duration of the optical pulse of RZ optical data, the length L of the PMF 220 is chosen to produce a time of arrival difference between the early optical pulse 210A and the late optical pulse 210B approximately equal to the duration of the input optical pulse 210, providing a stretching factor of 2. For other cases, the length L of the PMF 220 is chosen to produce a time of arrival difference between the early optical pulse 210A and the late optical pulse 210B based on any part or multiple of the duration of the input optical pulse 210.

In practice, if a photodetector 230 is not coupled to the output of the PMF 220, the output of the PMF 220 is coupled to a low-birefringence medium such as a single mode fiber (SMF) to minimize further separation between the early optical pulse 210A and the late optical pulse 210B. When the optical pulses 210A and 210B are ultimately detected by a photodetector 230, the resulting photocurrent 240 will be identical in duration to that resulting from detection of any optical pulse of arbitrary polarization whose duration is approximately equal to twice that of the input optical pulse 210. At the output of the PMF 220, the duration of the optical pulse 210 of the RZ optical data stream has been stretched into a duration associated with the NRZ optical data stream.

The fact that the output of the PMF 220 comprises two orthogonally polarized optical pulses prevents interference between the early optical pulse 210A and the late optical pulse 210B. Polarization-insensitive photodetectors detect the early optical pulse 210A and the late optical pulse 210B without problems. It should be noted that polarization-sensitive photodetectors will not be able to correctly view the stretched optical pulse without first removing their polarization selectivity.

As described above, the optical pulse 210 is sent with a linear polarization into the input of the birefringent medium 220. A polarization controller can be used to convert any polarization to linear polarization of the proper angle. Because the optical pulses 210A and 210B travel through a single birefringent medium 220, any propagation time variations due, for example, to temperature variations, will cause a minimal variation in the time delay between fast and slow pulses 210A and 210B.

Figure 2B:
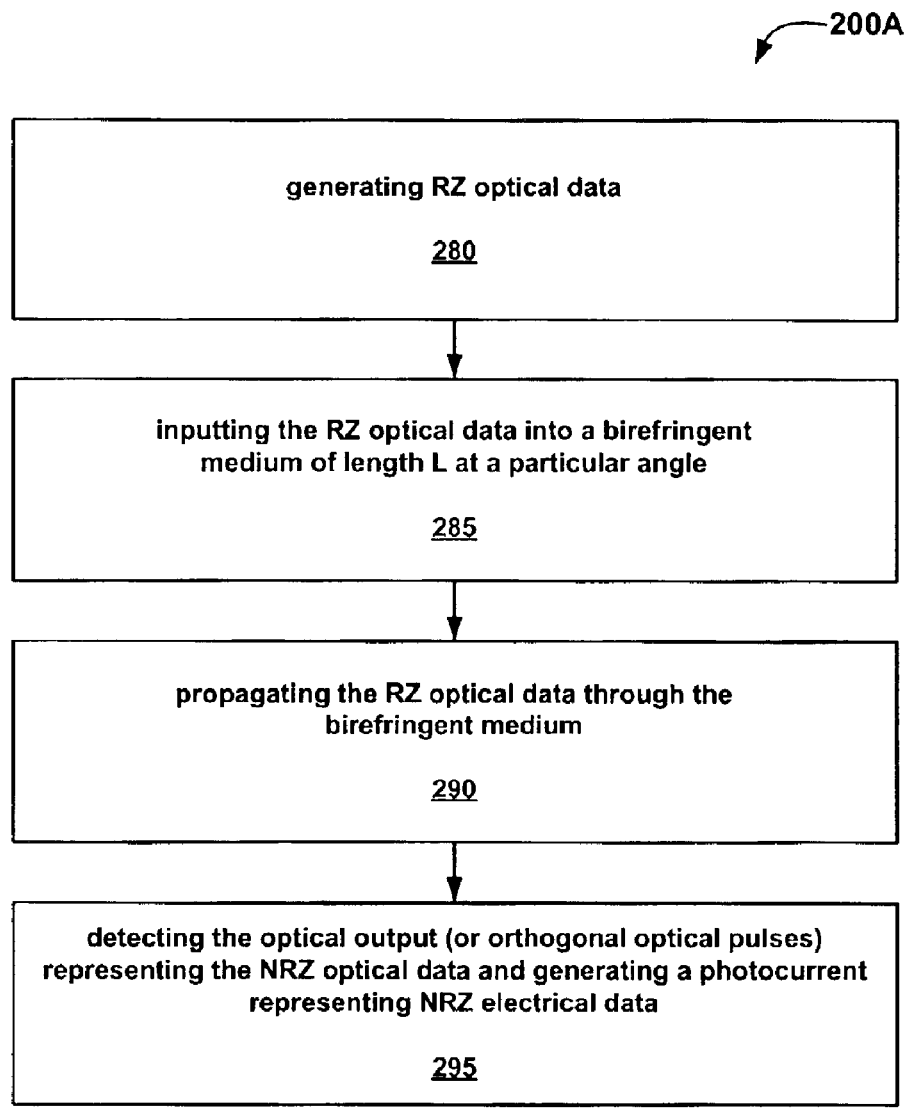
FIG. 2B illustrates a flow chart showing a method of converting optical data from a first format to a second format in accordance with an embodiment of the present invention.

FIG. 2B illustrates a flow chart showing a method 200A of converting optical data from a first format to a second format in accordance with an embodiment of the present invention. In an embodiment, the first format is RZ (return-to-zero) and the second format is NRZ (non-return-to-zero).

At Step 280, the RZ optical data is generated. The RZ optical data can be outputted by an optical retiming device that optically retimes the NRZ optical data using a "pulse carving" technique. This "pulse carving" technique will be described below.

Continuing at Step 285, the RZ optical data is inputted into a birefringent medium. As stated above, the birefringent medium can be comprised of any of various materials. Optic fiber, birefringent quartz, and birefringent alumina are examples of materials suitable for the birefringent medium. In an embodiment, the birefringent medium 220 is a polarization maintaining fiber (PMF). Moreover, the RZ optical data enters the input of the birefringent medium with linear polarization along an axis that is 45 degrees to the principal axes F and S of the birefringent medium. At 45 degrees, equal portions of the RZ optical data travel along the fast axis F and slow axis S, resulting in a pulse-type shape when the two portions are detected at the output of the birefringent medium. Also, the birefringent medium has a length L.

At Step 290, the RZ optical data is propagated through the length L of the birefringent medium. In one embodiment, the length L of the birefringent medium is chosen to produce a time of arrival difference between an early optical pulse of the RZ optical data and a late optical pulse of the RZ optical data approximately equal to the duration of the optical pulse of the RZ optical data, providing a stretching factor of 2. This is done because the duration of the optical pulse in a NRZ optical data stream is typically approximately twice the duration of the optical pulse in a RZ optical data stream.

Furthermore at Step 295, the optical output of the birefringent medium 220 is detected with a photodetector 230. The optical output comprises a first portion (or first orthogonal output optical pulse) of the RZ optical data that traveled along the fast axis F and a second portion (or second orthogonal output optical pulse) of the RZ optical data that traveled along the slow axis S. The combination of these output optical pulses represents the NRZ optical data having a stretched optical pulse with respect to the optical pulse of the RZ optical data. The photodetector 230 generates a photocurrent representing NRZ electrical data, whereas the photocurrent has a shape resembling a stretched pulse with respect to the shape of the optical pulse of the RZ optical data.

Figure 4:
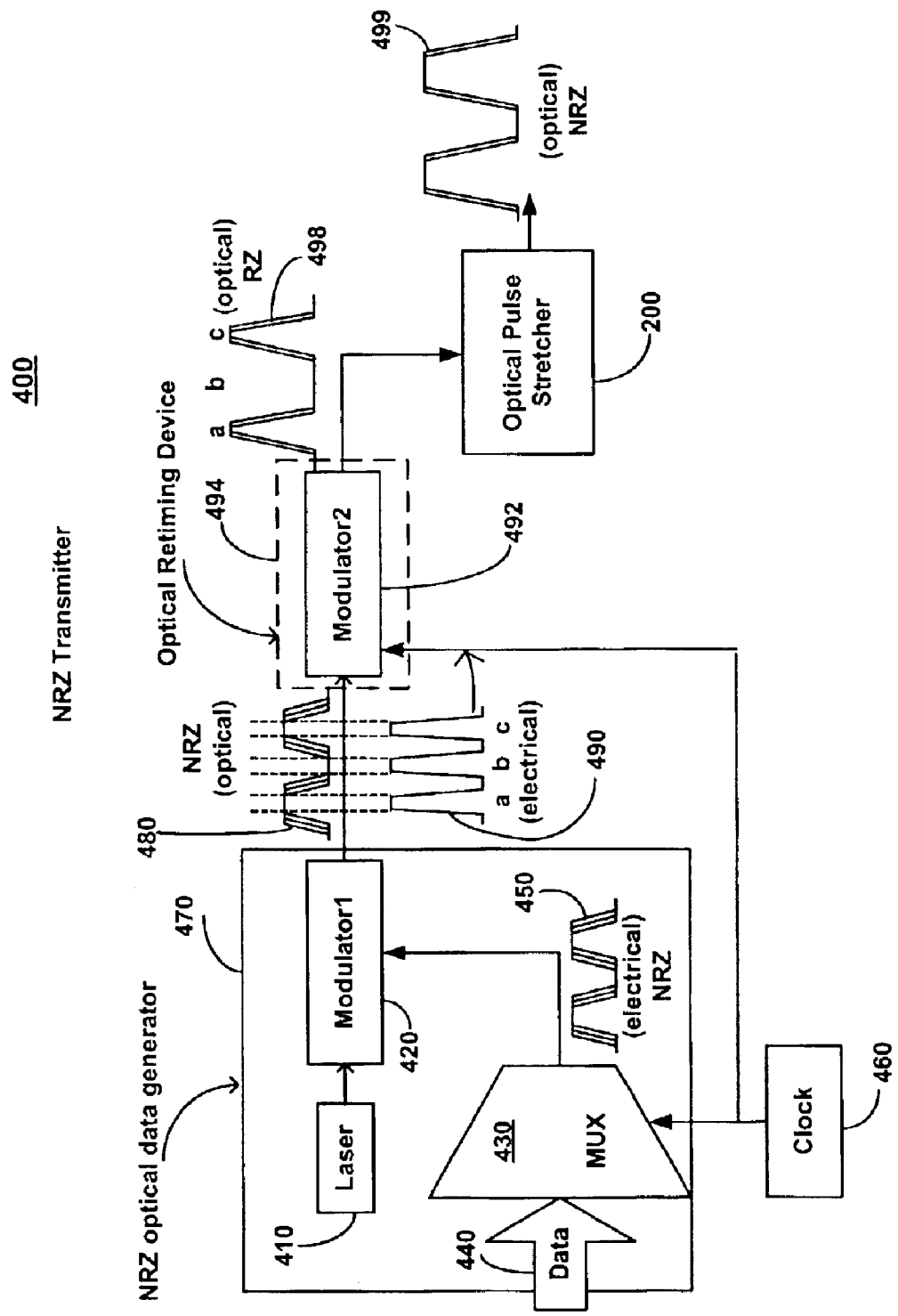
FIG. 4 illustrates a low jitter NRZ transmitter in accordance with an embodiment of the present invention.

FIG. 4 illustrates a low jitter NRZ transmitter 400 in accordance with an embodiment of the present invention. Many electronic circuits reduce jitter by retiming, that is, by re-synchronizing the data state transitions to a reference clock. A form of optical retiming is accomplished by pulse carving. With this method, a narrow portion of an NRZ optical data stream is "carved" by a reference clock using an optical data modulator. Since the clock driving the pulse carver is free of data-dependent jitter, the resulting RZ data pulses are largely free of data-dependent jitter. Thus, the data-dependent jitter of the NRZ optical data transitions is largely removed.

As shown in FIG. 4, the low jitter NRZ transmitter 400 comprises a NRZ optical data generator 470, a first optical medium (e.g., optical retiming device 494), and a second optical medium (e.g., optical pulse stretcher 200). In particular, the first optical medium and the second optical medium optically reduce the jitter of an optical data stream generated by the NRZ optical data generator 470, whereas the optical data stream has optical pulses. In an embodiment, the first optical medium is an optical retiming device 494 while the second optical medium is an optical pulse stretcher 200 as described above.

The optical retiming device 494 is adapted to receive an optical data stream encoded in a first format and having a first level of jitter. Moreover, the optical retiming device 494 optically reduces the jitter of the optical data stream. It also converts the format of the optical data stream encoded in the first format to a second format having a second level of jitter that is lower than the first level of jitter. In an embodiment, the first format is an optical NRZ (non-return-to-zero) format while the second format is an optical RZ (return-to-zero) format.

The optical pulse stretcher 200 is adapted to receive the optical data stream encoded in the second format. Furthermore, the optical pulse stretcher 200 optically stretches the optical data stream to convert the format of the optical data stream encoded in the second format to the first format having a third level of jitter which is no greater than the second level of jitter. Thus, the optical pulse stretcher 200 performs the pulse stretching in a purely optical manner, enabling the stretching of low-jitter RZ optical pulses without having to convert these optical pulses to electronic form prior to stretching, a process which could introduce unwanted jitter to the stretched optical pulses.

Within the NRZ optical data generator 470, low data rate electrical data 440 is multiplexed into a high rate electrical data stream 450 (NRZ format) by the multiplexer 430, which is synchronized by a clock 460. A light source 410, such as a laser, provides continuous light to the modulator1 420, which generates an NRZ optical data stream 480 derived from the NRZ electrical data stream 450. NRZ optical data stream 480 includes the jitter (e.g., a first level of jitter) of the NRZ electrical data stream 450 and any other jitter added by the modulator1 420.

Moreover, within the optical retiming device 494, the clock 460 drives electro-optical modulator2 492, which acts as an optical AND gate. That is, the electro-optical modulator2 492 passes light only when the NRZ optical data stream 480 and the clock signal 490 are in the logic "1" state. The resulting output optical data stream 498 includes RZ-encoded pulses a and c with reduced jitter (e.g., a second level of jitter which is lower than the first level of jitter). Then, the optical pulse stretcher 200 converts the resulting output optical data stream 498 into a NRZ optical data stream 499 as described above, whereas the NRZ optical data stream 499 includes the low jitter properties (e.g., a third level of jitter which is no larger than the second level of jitter) of the resulting output optical data stream 498.

Figure 5A:
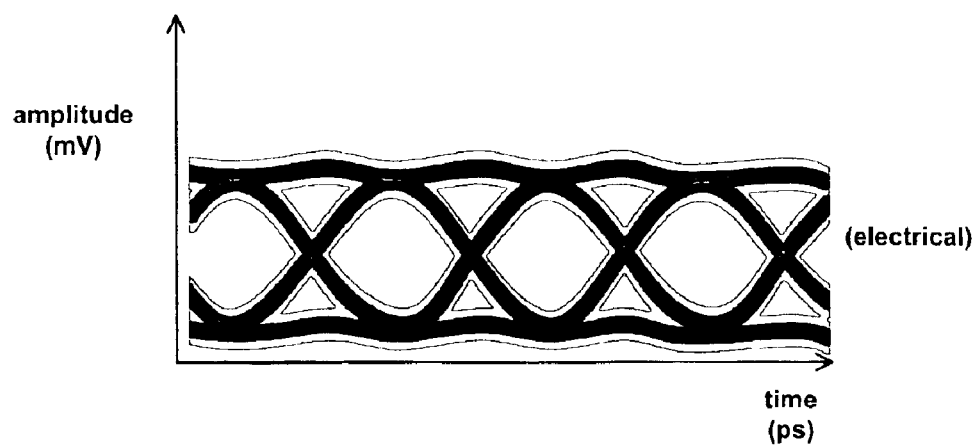
FIG. 5A illustrates NRZ formatted PRBS (pseudo-random binary sequence) eye diagram from the low jitter NRZ transmitter of FIG. 4 without optical retiming and without the optical pulse stretcher in accordance with an embodiment of the present invention.
Figure 5B:
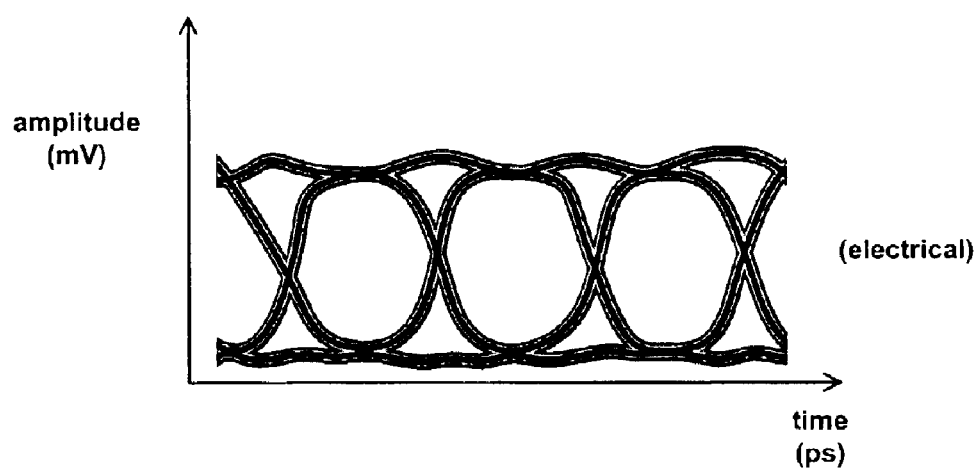
FIG. 5B illustrates NRZ formatted PRBS (pseudo-random binary sequence) eye diagram from the low jitter NRZ transmitter of FIG. 4 with optical retiming and the optical pulse stretcher in accordance with an embodiment of the present invention.

FIG. 5A illustrates NRZ formatted PRBS (pseudo-random binary sequence) eye diagram from the low jitter NRZ transmitter of FIG. 4 without optical retiming and without the optical pulse stretcher in accordance with an embodiment of the present invention. FIG. 5B illustrates NRZ formatted PRBS (pseudo-random binary sequence) eye diagram from the low jitter NRZ transmitter of FIG. 4 with optical retiming and the optical pulse stretcher in accordance with an embodiment of the present invention. These experimental results indicate a jitter improvement of approximately 3:1 between FIGS. 5A and 5B. Although this specific jitter improvement is shown in the present example, the present invention is well suited to provide other ranges of jitter improvement.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for stretching an optical pulse to convert associated optical data from a first format to a second format, comprising:

an optical retiming device adapted to receive said optical pulse with said associated optical data in said second format, wherein said optical retiming device reduces a jitter associated with said optical pulse by converting said associated optical data from said second format to said first format and outputs said optical pulse with said associated optical data in said first format;

a birefringent medium adapted to receive said optical pulse with said associated optical data in said first format and adapted to propagate said optical pulse to convert said associated optical data to said second format, wherein said birefringent medium includes a first principal axis, a second principal axis which is orthogonal to said first principal axis, and a length such that a time difference between propagation along said first principal axis over said length and propagation along said second principal axis over said length is based on a duration of said optical pulse; and an input coupled to said birefringent medium and adapted to receive said optical pulse with linear polarization at a first angle relative to said first principal axis and at a second angle relative to said second principal axis.

2. The apparatus as recited in claim 1 wherein said birefringent medium is an optical fiber.

3. The apparatus as recited in claim 2 wherein said optical fiber is a polarization maintaining fiber.

4. The apparatus as recited in claim 1 wherein said first angle is approximately 45 degrees and wherein said second angle is approximately 45 degrees.

5. The apparatus as recited in claim 1 wherein said time difference is approximately equal to said duration of said optical pulse.

6. The apparatus as recited in claim 1 wherein said first format is an optical RZ (return-to-zero) format and wherein said second format is an optical NRZ (non-return-to-zero) format.

7. A system for transmitting optical data, comprising:

an optical data generator adapted to generate a first optical data encoded in a first format;

an optical retiming device adapted to receive said first optical data, wherein said optical retiming device reduces a jitter associated with said first optical data by converting from said first format to a second format and outputs a second optical data encoded in said second format; and an apparatus adapted to receive said second optical data and to stretch said second optical data to convert from said second format to said first format, comprising:

a birefringent medium adapted to propagate said second optical data, wherein said birefringent medium includes a first principal axis, a second principal axis which is orthogonal to said first principal axis, and a length such that a time difference between propagation along said first principal axis over said length and propagation along said second principal axis over said length is based on a duration of an optical pulse associated with said second optical data; and an input coupled to said birefringent medium and adapted to receive said second optical data with linear polarization at a first angle relative to said first principal axis and at a second angle relative to said second principal axis.

8. The system as recited in claim 7 wherein said birefringent medium is an optical fiber.

9. The system as recited in claim 8 wherein said optical fiber is a polarization maintaining fiber.

10. The system as recited in claim 7 wherein said first angle is approximately 45 degrees and wherein said second angle is approximately 45 degrees.

11. The system as recited in claim 7 wherein said time difference is approximately equal to said duration of said optical pulse.

12. The system as recited in claim 7 wherein said first format is an optical NRZ (non-return-to-zero) format and wherein said second format is an optical RZ (return-to-zero) format.

13. The system as recited in claim 7 wherein said optical data generator comprises a light source, a modulator adapted to receive light from said light source, a multiplexer coupled to said modulator and adapted to provide electrical data encoded in said first format, and a clock for clocking said multiplexer.

14. The system as recited in claim 7 wherein said optical retiming device comprises a modulator driven by a clock signal such that said modulator operates as an optical AND gate on said first optical data.

15. A method of converting optical data from a first format to a second format, said method comprising:

generating said optical data encoded in said first format, wherein said generating said optical data comprises:

generating an initial optical data encoded in said second format, optically retiming said initial optical data to reduce jitter such that said initial optical data is converted from said second format to said first format;

inputting said optical data encoded in said first format into a birefringent medium at a particular angle, wherein said birefringent medium includes a first principal axis, a second principal axis which is orthogonal to said first principal axis, and a length such that a time difference between propagation along said first principal axis over said length and propagation along said second principal axis over said length is based on a duration of an optical pulse associated with said optical data encoded in said first format;

propagating said optical data encoded in said first format through said birefringent medium to generate said optical data encoded in said second format at output of said birefringent medium.

16. The method as recited in claim 15 wherein said birefringent medium is an optical fiber.

17. The method as recited in claim 16 wherein said optical fiber is a polarization maintaining fiber.

18. The method as recited in claim 15 wherein said particular angle is approximately 45 degrees relative to said first principal axis and approximately 45 degrees relative to said second principal axis.

19. The method as recited in claim 15 wherein said time difference is approximately equal to said duration of said optical pulse.

20. The method as recited in claim 15 wherein said first format is an optical RZ (return-to-zero) format and wherein said second format is an optical NRZ (non-return-to-zero) format.

21. The method as recited in claim 15 further comprising:
detecting said optical data encoded in said second format using a photodetector.

22. A method of optically reducing jitter, said method comprising:
receiving optical data encoded in a first format and having a first level of jitter at a first optical medium adapted to optically reduce said jitter of said optical data and to convert said optical data encoded in said first format to a second format having a second level of jitter which is lower than said first level of jitter; and
receiving said optical data encoded in said second format at a second optical medium adapted to optically stretch said optical data to convert said optical data encoded in said second format to said first format having a third level of jitter which is no greater than said second level of jitter.

23. The method as recited in claim 22 wherein said first optical medium is an optical retiming device that performs optical pulse carving.

24. The method as recited in claim 23 wherein said optical retiming device is a modulator driven by a clock signal such that said modulator operates as an optical AND gate on said optical data encoded in said first format.

25. The method as recited in claim 22 wherein said second optical medium comprises:
a birefringent medium adapted to propagate said optical data encoded in said second format, wherein said birefringent medium includes a first principal axis, a second principal axis which is orthogonal to said first principal axis, and a length such that a time difference between propagation along said first principal axis over said length and propagation along said second principal axis over said length is based on a duration of an optical pulse associated with said optical data; and
an input coupled to said birefringent medium and adapted to receive said optical data with linear polarization at a first angle relative to said first principal axis and at a second angle relative to said second principal axis.

26. The method as recited in claim 25 wherein said birefringent medium is an optical fiber.

27. The method as recited in claim 26 wherein said optical fiber is a polarization maintaining fiber.

28. The method as recited in claim 25 wherein said first angle is approximately 45 degrees and wherein said second angle is approximately 45 degrees.

29. The method as recited in claim 25 wherein said time difference is approximately equal to said duration of said optical pulse.

30. The method as recited in claim 25 wherein said first format is an optical NRZ (non-return-to-zero) format and wherein said second format is an optical RZ (return-to-zero) format.

* * * * *